United States Patent [19]
McDonald

[11] Patent Number: 4,840,024
[45] Date of Patent: Jun. 20, 1989

[54] MULTIPLE PROPELLANT SOLID ROCKET MOTOR

[75] Inventor: Allan J. McDonald, Pleasant View, Utah

[73] Assignee: Morton Thiokol, Inc., Chicago, Ill.

[21] Appl. No.: 642,469

[22] Filed: Aug. 20, 1984

[51] Int. Cl.⁴ ............................................. F02C 3/20
[52] U.S. Cl. ................... 60/39.461; 60/225; 60/253
[58] Field of Search .................. 60/39.46, 225, 226, 60/245, 253, 254, 39.461

[56] References Cited

U.S. PATENT DOCUMENTS

| | | | |
|---|---|---|---|
| 3,065,596 | 11/1962 | Schultz | 60/254 X |
| 3,065,598 | 11/1962 | Schultz | 60/254 X |
| 3,171,248 | 3/1965 | Cedwith | 60/254 X |
| 3,724,217 | 4/1973 | McDonald | 60/254 |
| 3,844,118 | 10/1974 | Wilkinson | 60/254 X |
| 4,023,355 | 5/1977 | McDonald | 60/254 |
| 4,075,832 | 2/1978 | Diesinger et al. | 60/254 X |
| 4,357,795 | 11/1982 | Bastian et al. | 60/254 X |

FOREIGN PATENT DOCUMENTS

| | | | |
|---|---|---|---|
| 2299520 | 1/1975 | France | 60/254 |
| 723040 | 2/1955 | United Kingdom | 60/254 |

OTHER PUBLICATIONS

"Solid-Staged Combustion Demonstrated," Aviation Week & Space Technology, Apr. 12, 1982, pp. 99 and 102.
"Aerojet Develops New Propulsion System to Give Re-Entry Vehicles More Power," Aviation Week & Space Technology, Apr. 1982, page unnumbered.

Primary Examiner—Peter A. Nelson
Attorney, Agent, or Firm—James C. Simmons; Gerald K. White

[57] ABSTRACT

An integrated stage rocket motor arrangement provides boost and repeated throttling post boost operations, on demand, and includes an attitude control system. The rocket motor includes a plurality of casings for enclosing an initial boost motor, a post boost motor, and gas generator means for producing gases that are used for re-ignition of the post boost motor and as a motive source for the attitude control system. The boost motor and post boost motor are contained within the same enclosure but are separated by an internal bulkhead. The rocket motor has a plurality of nozzles one of which is located aft of the boost motor and another located within the internal bulkhead that separates the boost and post boost motors.

22 Claims, 1 Drawing Sheet

MULTIPLE PROPELLANT SOLID ROCKET MOTOR

The Government has rights in this invention pursuant to Contract No. N00030-81-C-0097 with the U.S. Navy Department.

BACKGROUND OF THE INVENTION

1. Field of the Invention

The present invention relates to a solid propellant rocket motor that utilizes a plurality of propellants and has the ability to start, stop and restart repeatedly and, in addition, control the attitude of the rocket in flight. The rocket motor is characterized in part by a high thrust in addition to a high impulse boost followed by a series of, on-demand, stop and restart metered or throttling operations.

2. Description of the Prior Art

The entire proplusive capability of solid propellant rocket motors is usually spent during the combustion of one solid propellant grain. This happens because once a grain of solid propellant is ignited it is difficult to stop the combustion process and the entire grain is normally consumed.

It has been proposed in the prior art to provide a solid propellant rocket motor with an ability to fire more than once, that is, a rocket motor with a "start-stop-restart" capability by providing two or more concentric units, that is, layers or zones of solid propellant in a combustion chamber with a flame inhibiting barrier separating the layers, the barrier being made of a material that will confine the burning to a single layer or zone, but which, nevertheless, is destructible so that the next adjacent layer may be ignited. The burning of each layer produces a thrust in the form of a discrete pulse.

One such arrangement for providing a rocket motor that may be fired more than once is disclosed in U.S. Pat. No. 3,293,855 granted on Dec. 27, 1966 to W. E. Cutill et al. wherein a pyrotechnic and an electrically ignitable film are provided between each of the layers for igniting, upon command, in turn, each of the next adjacent layers. Similarly, U.S. Pat. No. 4,357,795 granted on Nov. 9, 1982 to Thomas W. Bastian et al. discloses a solid rocket fuel with a plurality of fuel layers, each independently ignitable. The layered sections are capable of being placed end to end within a casing.

Other such arrangements are disclosed in U.S. Pat. Nos. 3,564,845 granted to I. H. Friedman et al. on Feb. 23, 1971 and 3,568,448 granted to G. E. Webb, Jr. on Mar. 9, 1971, wherein one of the two solid propellant concentric layers that are separated by a flame inhibiting barrier is ignited by an igniter that is extended through the rocket motor nozzle into the combustion chamber. The other layer is ignited by a gas generator that is connected by a tubular extension to the head end of the combustion chamber. A rupturable membrane seal and perforated support member assembly is provided to isolate the gas generator from the motor combustion chamber during burning of the first rocket propellant layer. U.S. Pat. No. 3,677,011 granted on Jul. 18, 1972 to C. W. Vickland discloses a dual thrust level rocket motor with restart capability including an oxidizer supply and plurality of injectors for delivering the oxidizer to the fuel grain. U.S. Pat. No. 3,677,010 granted on Jul. 18, 1972 to R. H. Fink et al. discloses a solid fuel rocket motor having a grain comprising a plurality of individual, concentric layers separated by a liner having insufficient oxidizer to sustain combustion. A liquid oxidizer that is hypergolic with the liner may be injected to ignite an exposed liner layer and the next adjacent propellant layer to extend the rocket's range. U.S. Pat. No. 3,457,727 granted on Jul. 29, 1969 to J. R. Munger discloses a solid fuel rocket motor utilizing a solid propellant and a liquid oxidizer injected in the rearward portion of the motor. U.S. Pat. No. 3,452,544 granted on Jul. 1, 1969 to R. L. Glick et al. discloses a solid propellant rocket motor with a single solid propellant grain having thrust boost-sustain and sustain-boost capabilities acheived with rocket motor mounted gas generator or quenching mechanisms.

U.S. Pat. No. 3,826,087 granted on Jul. 30, 1974 to Allan J. McDonald discloses a solid propellant rocket in which gas generators produce gases that are mixed and burned to produce thrust for the rocket.

U.S. Pat. Nos. 3,340,691 granted on Sept. 12, 1967 to G. F. Mangnum and 3,354,647 granted on Nov. 28, 1967 to W. C. Aycock disclose arrangements similar to each other involving the admission of liquid fuel to a combustion chamber for the destruction of a flame inhibiting barrier and the ignition of an adjacent layer of propellant.

All of the above prior art disclosures are characterized in the provision of a single combustion chamber for a plurality of concentric solid propellant layers of zones, involving the destruction of a flame inhibiting barrier between layers in order to initiate combustion in firing of the next adjacent layer, and in the use of a relatively complicated ignition arrangement for effecting destruction of the barrier and ignition of the adjacent layer. The Freidman, Jr. et al. and Webb, Jr. patents involve the use of a rupturable membrane and perforated support member which when ruptured and disintegrated, respectively, tend to introduce debris into the combustion chamber. The Mangum and Ayecock patents involve the admission of liquid fuel to the combustion chamber.

U.S. application Ser. No. 498,603, filed on May 26, 1983 by M. Fling et al. and assigned to the assignee of the present invention, discloses a solid propellant rocket motor that may be fired more than once and which involves the use of plural concentrically or tandemly fabricated combustion chambers which are separated by a perforated bulkhead and each of which contains an individually associated propellant. Pressure responsive membrane means positioned in a first one of the chambers' covers the perforation in the bulkhead to preclude communication between the chambers when a substantially higher pressure is present in the first one of the chambers than in an adjacent chamber and allows communication between the chambers when the pressures in the chambers is reversed.

Numerous other arrangements directed towards controlled flight of solid propellant rocket motors are disclosed in the prior art. Among these arrangements are the following U. S. Patents:

U.S. Pat. No. 3,811,380, J. P. Glass;
U.S. Pat. No. 3,668,872, A. T. Camp et al.;
U.S. Pat. No. 3,494,130, S. Zeman;
U.S. Pat. No. 3,457,726, J. Trotel;
U.S. Pat. No. 3,434,287, L. Caveny;
U.S. Pat. No. 3,398,537, J. E. Picquendar;
U.S. Pat. No. 3,349,565, A. E. Williams;
U.S. Pat. No. 3,349,563, E. L. Taylor;
U.S. Pat. No. 3,248,875, R. D. Wolcott;

U.S. Pat. No. 3,266,237, C. J. Crowell et al.;
U.S. Pat. No. 3,011,309, J. M. Carter;

Implicit in the foregoing discussion is an inherent limitation in all of the different types of solid propellant rocket motors discussed, i.e., the inability to provide a high thrust and/or high impulse boost pulse followed by a series of stop/restart throttling operations, on demand.

SUMMARY OF THE INVENTION

A primary object of the invention is to provide a solid propellant rocket motor having thrust and/or high impulse boost pulse followed by a series of controlled stop and restart throttling operations, on demand.

Another object of the invention is to provide a solid propellant rocket motor utilizing a number of propellants and consisting of a boost motor integral with a stop/start post boost motor which is controlled by a gas generator for providing stop/restart capability as well as attitude control, if desired.

Another object of the invention is to provide a single propulsion system that is capable of accomplishing both boost and post boost operations.

Still another object of the invention is to provide a reliable yet relatively inexpensive solid propellant rocket motor capable of performing multiple stop and restart burns on demand. Yet another object of the invention is to provide a solid propellant rocket motor of minumum volume and weight that is capable of accomplishing boost and repeated post boost ignitions.

Another object of the invention is to provide a solid propellant rocket motor incorporating a gas generator with increased operating flexibility and on demand throttling in addition to total extinquishment.

Another object of the invention is to provide an integrated solid propellant rocket motor with a capability for extreme thrust ratios with respect to the boost and post boost thrust.

Still another object of the invention is to provide a solid propellant rocket motor with boost and repeated post boost thrust which has extreme packaging adaptability and performance flexiblity.

A further object of the invention is to provide a solid propellant rocket motor having as an added feature an integrated attitude control system (ACS) thereby enabling dual use of the gas generator product.

In accomplishing these and other objectives of the invention there is provided a rocket motor having a plurality of casings for enclosing the initial boost motor, the post boost motor, and gas generator means for producing gases that are used both for re-ignition of the post boost motor and as a motive source for an attitude control system. The boost motor and post boost motor are contained within the same enclosure but are operatively separated by an internal bulkhead. The rocket motor contains a plurality of nozzles. At least one nozzle is located aft of the boost motor and another nozzle is located within the internal bulkhead intermediate the boost motor and post boost motor.

BRIEF DESCRIPTION OF THE DRAWINGS

Having summarized the invention, a detailed description follows with reference being made to the accompanying drawings which form part of the specification, of which.

DESCRIPTION OF THE PREFERRED EMBODIMENT

Figure 1:
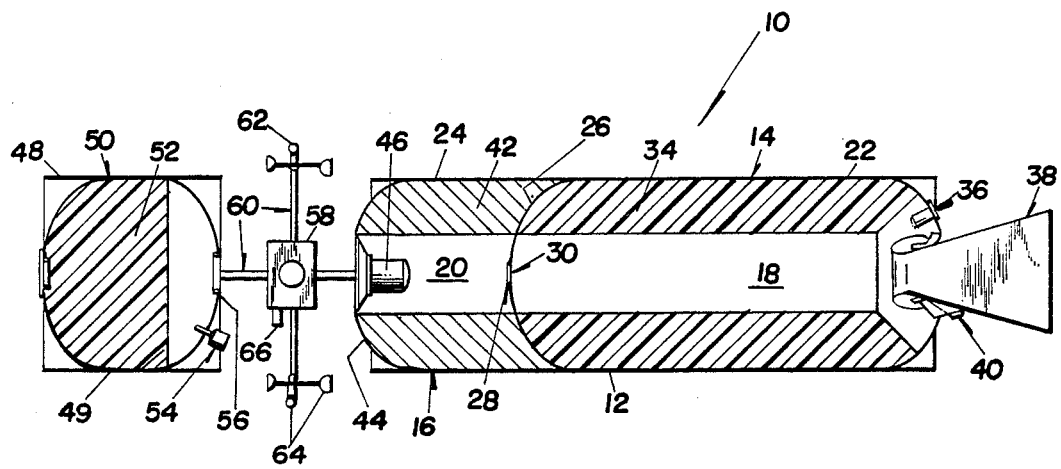
FIG. 1 is a schematic diagram of a preferred embodiment of the invention comprising a boost motor integral with a stop/restart post boost motor, the latter of which is controlled by a gas generator for providing repeated stop/restart capability as well as attitude control, if desired.

Referring to FIG. 1 of the drawings, the reference numeral 10 is used to generally designate a solid propellant rocket motor.

The solid propellant rocket motor 10 includes a first rocket motor casing 12 which is cylindrical and contains therein a solid propellant boost motor 14 and an extinguishable solid propellant post boost motor 16. The boost motor and post boost motors 14 and 16 each include a respectively associated combustion chamber, specifically a boost motor chamber 18 and a post boost motor chamber 20. Chamber 18 is formed within a first enclosure portion 22 of motor casing 12, and chamber 20 is formed within a second enclosure portion 24 of casing 12. Casing 12 may be made of any suitable material with each enclosure portion 22 and 24 desirably including a liner of rubber compound bonded to the interior wall thereof.

Enclosure portions 22 and 24 share a common internal heat or flame resistant insulating bulkhead 26. The bulkhead 26 includes an opening therein which forms a post boost pressure control nozzle 28. Nozzle 28 allows communication between the boost motor 14 and the post boost motor 16 during post boost motor operation, as described hereinafter. The repeated ignition capability of the post boost motor 16 is one of the keys to the successful operation of the multiple propellant solid rocket motor of the present invention. Nozzle 28 is important in controlling the pressure in the post boost motor chamber 20 and the rate of pressure decay during operation of the post boost motor 16. Therefore, the area of the opening of control nozzle 28 bears considerably on proper post boost motor operation. The area of the opening of nozzle 28, as shown in FIG. 3, has been designated as $A_2$.

Figure 2A:
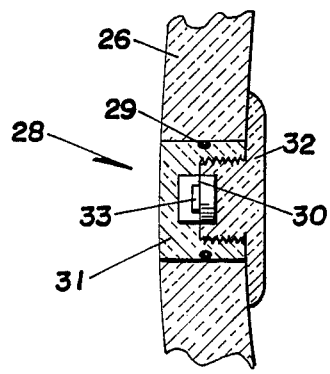
FIG. 2A is a fragmented view showing an insulated, explosively activated, plug burst diaphragm that is provided between the boost motor and the post boost motor.
Figure 2B:
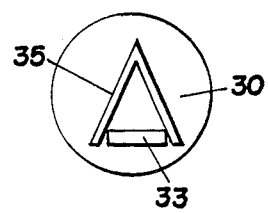
FIG. 2B is a plan view showing a linear shaped explosive charge that may be provided on the burst diaphragm of FIG. 2A.

Bulkhead 26 includes an insulated rupturable disc or burst diaphram 30, as seen better in FIG. 2A, that initially plugs the post boost pressure control nozzle 28. Diaphragm 30 is supported within a two-part plug 31, 32 of heat insulation material that is press fit within opening 28, being retained therein by a suitable O-ring 29 and prevents premature ignition of the post boost motor 16 during operation of the boost motor 14. Just prior to operation of the post boost motor 16, the insulated burst diaphram 30 must be ruptured or otherwise removed from bulkhead 26. This may be accomplished by means of an explosive device 33 that is positioned adjacent diaphragm 30 and the actuation of which may be effected by electrical or pyrotechnic fuze means, not shown. Detonation of the explosive device 33 ruptures the diaphragm 30 thereby opening post boost pressure control nozzle 28. In one preferred embodiment of the invention, the explosive device 33 may comprise a linear shape charge 35 of known type generally shaped, as shown in FIG. 2B, to the contour of burst diaphram 30 such that, on detonation, the burst diaphragm 30 is relatively cleanly separated from bulkhead 26. In another embodiment of the invention, the linear shape charge may be shaped such that with enough explosive power a hole is blown in bulkhead 26, thereby forming pressure control nozzle 28.

Solid boost motor 14, as shown in FIG. 1, includes a hollow, high energy boost motor propellant grain 34 within the boost motor for providing an initial high thrust or high impulse boost pulse. Propellant grain 34 may be cast into or bonded to the insulating layer on the internal wall of enclosure portion 22. The boost motor 14 also includes at the aft end thereof a boost motor igniter 36 for igniting the boost motor propellant grain 34. Igniter 36 may include an electric squib in contact with a pyrotechnic material such that upon firing of the squib the pyrotechnic material is ignited which in turn ignites propellant grain 34. Any one of a number of pyrotechnic materials may be used in the igniter 36 including a granular mixture of 25 percent by weight of boron and 75 percent by weight of potassium nitrate.

Figure 3:
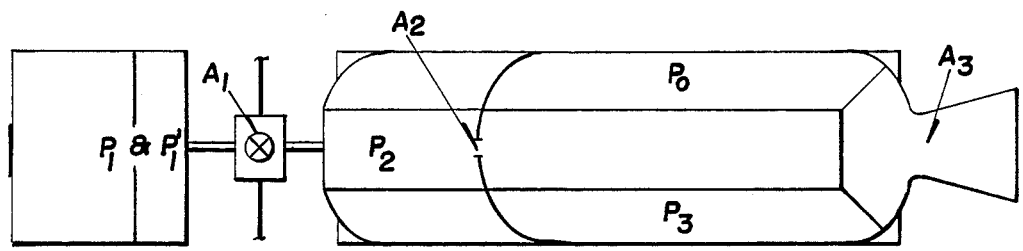
FIG. 3 is a diagram illustrating physical relationships between various components of the preferred invention embodiment of FIG. 1.

Boost motor 14 includes, at a position aft thereof, a nozzle 38 which may be of the convergent-divergent type and has an operative area or throat, designated $A_3$, as seen in FIG. 3, which area is larger than area $A_2$ of nozzle 28 of post boost motor 16. In a preferred embodiment, the nozzle 38 is an omniaxis movable nozzle which is adapted to provide rocket motor 10 with thrust vector control capability. The nozzle 38 is controllably operated by means of a nozzle actuator 40. The structure and operation of nozzle 38 and actuator 40 may be similar or identical to that disclosed in U.S. Pat. No. 4,435,023, issued on Mar. 6, 1984 to Thomas E. Bolner and assigned to the assignee of the present invention, for "Internally Actuated Spherical Bearing."

An extinguishable hollow propellant grain 42 is located within the post boost motor enclosure portion 24. Propellant grain 42 may be cast into or bonded to the insulating layer or liner on the interior wall of enclosure portion 24. The shape of the forward end of grain 42 desirably conforms to the curvature of the forward interior wall of case 24. Propellant grain 42 extends from the head end 44 of enclosure portion 24 to the insulating bulkhead 26, or otherwise, as required to place a desired amount of extinguishable propellant in chamber 20. A diffuser 46 located within chamber 20 distributes an igniting gaseous medium on the exposed surface of propellant grain 42. Diffuser 46 is located within post boost chamber 20 adjacent the forward interior wall enclosure portion 24. The inlet for diffuser 46 is connected to the exterior of first motor casing 12, as further described below.

A second motor casing 48 which forms a third enclosure 49 housing a gas generator 50, is located adjacent first motor casing 12. The gas generator 50 includes a gas generator propellant grain 52 and a gas generator multiple igniter 54 which may be of a known electrical arc or bridge wire type. The gas generator grain 52 may comprise a propellant having a combustion temperature in the range of 2000° F. to 3000° F. A typical gas generator propellant that may be employed is a 3000° HTPB/HMX gas generator propellant. The gas generator grain 52 is formed or cast within casing 48 opposite an exit opening 56 for gaseous exhaust from the gas generator 50 during combustion of propellant grain 52.

A multiport gas generator flow control valve 58 is located intermediate first casing 12 and second casing 48 and is situated such that it controls the flow of gas from gas generator 50. The flow control valve 58 has a number of inlet and outlet ports and is operative to provide a flow of gas from generator 50 through a manifold system 60 to an attitude control system (ACS) 62, or to the diffuser 46 within the chamber 20 of the post boost motor 16. When directed to the diffuser 46, the gas generator flow ignites and reacts with the post boost motor extinguishable propellant to provide increased specific impulse. Increased specific impulse results from the secondary combustion of the gas generator gases mixing with the post boost extinguishable propellant gases; specific impulse increases from 40-60 seconds can be achieved by the proper combination of gases from gas generator propellant 52 and post boost motor extinguishable propellant 42.

The pressure in the post boost motor 16 is controlled by the opening 28 in the internal bulkhead 26 which serves as a post boost pressure control nozzle. Extinguishment of the post boost motor can be obtained by diverting the generated gas flow to the attitude control system 62 through the gas generator flow control valve 58 and manifold system 60, or by terminating combustion of the gas generator propellant 52 within generator 50. Termination of operation of the gas generator 50 can be effected by opening a large valve area of valve 58, for example, as indicated at outlet port 66, which allows rapid depressurization of the gas generator 50 to the atmosphere, thereby causing extinguishment of the gas generator propellant 52.

As noted, gases from the gas generator 50 can be diverted by manifold system 60 to various discharge ports or thrusters, as indicated at 64, that may be used to control attitude, roll or direction of the solid propellant rocket motor 10.

Thus, in operation, the multiple propellant solid rocket motor relies on boost motor 14 integral with post boost motor 16 in which combustion in the post boost motor 16 is controlled by a gas generator 50 such that operation of the post boost motor 16 may be repeatedly totally stopped, restarted and throttled as desired. In addition, the operation of the gas generator 50 may also be repeatedly totally stopped and restarted. When the operation of gas generator 50 is stopped, it is noted that there is then total extinguishment of all propellant grains 34, 42 and 52, the propellant grain 34 having been totally consumed during previous operation of boost motor 14.

Boost igniter 36 igites the high energy boost propellant grain 34 to operate the boost motor 14 and provide a high thrust or high impulse boost pulse. Omniaxis movable nozzle 38 accomplishes the thrust vector control of the rocket by means of its associated nozzle actuator 40. During boost motor operation, the insulating internal bulkhead 26 separates the boost motor 14 from the post boost motor 16 in order to prevent premature ignition of the post boost motor 16 in view of the high temperatures generated during boost motor operation.

Upon completion of the burning of the boost motor propellant grain 34, the now empty boost motor chamber 18 acts as a plenum for post boost motor 16 operation whereby the movable nozzle 38 continues to be effective to provide the required thrust vector control.

Prior to operation of the post boost motor 16 explosive device 32 is activated to rupture the burst diaphram 30 or to blow a desired size hole for nozzle 28 in the insulating internal bulkhead 26. The multiple igniter 54 then is activated to ignite the gas generator grain 52. The resultant gaseous flow is channeled through multiport flow control valve 58 to the diffuser 46 with the valve 58 controlling both pressure and flow rate of the generated gas flow. The post boost motor propellant grain 42 ignites upon contact therewith of the gas that has been dispersed in the chamber 20 by the diffuser 46. The ignition and reaction of the gaseous flow through the diffuser 46 with the post boost motor extinguishable propellant grain 42 provides an increased specific impulse by means of the secondary combustion of the generated gas mixing with the gases of the post boost extinguishable propellant grain 42. As mentioned hereinbefore, significant specific impulse increase from 40 to 60 seconds can be achieved by a proper combination of gas generator and post boost motor propellant gases.

The post boost pressure control nozzle 28 controls the post boost motor pressure during operation of post boost motor 16. Burning of the post boost motor propellant grain 42 may be extinguished by means of diversion of the gas from generator 50 to either the attitude control system 62 through the gas generator flow control valve 58 or by diversion of the generated gas flow through a valve outlet port 66 which may open directly to the atmosphere whereby the gas generator chamber may be rapidly depressurized and consequently combustion of the gas generator propellant grain 52 extinguished. Rapid depressurization such as this requires a relatively large valve area for outlet port 66.

As previously mentioned, the repeated stop and start capability of the post boost motor 16 exhibits a sensitivity to the post boost motor pressure control nozzle area $A_2$ of nozzle 28 which controls the pressure and rate of pressure decay in the post boost motor chamber 20 upon discontinuation of gas flow to the post boost motor 16 from generator 50. The area $A_2$ of the control nozzle 28 also controls the ratio of burning surface area to throat area (for convenience referred to herinafter as Kn) and motor free volume to throat area ratio (for convenience referred to herinafter as L*). These are the two controlling parameters for designing a rocket motor configuration according to the present invention that is capable of extinguishment during post boost motor operation. Given hereinafter are examples of these parameters that would provide the extinguishment capabilities of the rocket motor of the present invention.

Area $A_3$ of the throat of omniaxis movable nozzle 38 attached to empty chamber 18 of boost motor 14 during post boost motor operation controls the thrust level and thrust decay transients of the post boost motor 16, but does not influence the extinguishment capability of the post boost motor 16 since area $A_3$ is greater than area $A_2$. It should also be mentioned that the insulating bulkhead 26 blocks heat radiation to the post boost motor propellant grain 42 during "off cycles" of the post boost motor 16 thereby preventing accidental ignition of the post boost motor grain 42.

In order for the above operation to be successful certain pressure and throat area relationships must be maintained. These relationships are explained in Table 1 and described below in relationship to FIG. 3 of the drawings.

As can be seen from Table 1, boost motor operation can use any propellant or motor configuration which is the most optimum without regard to boost motor operating pressure, within the constraints of the arrangement chosen. The same holds true for the gas generating operating pressure during attitude control, again as long as container structural constraints are not exceeded. Important to the operation of this present invention is the understanding that the generated gas flow through the post boost pressure control nozzle 28 must always be choked flow. The operative area of the flow control desirably is variable in order to provide different areas and/or flow directions and throttling for the attitude control system and post boost motor operation.

TABLE 1

| Parameter | Operation | Description | Relationship | Reason |
|---|---|---|---|---|
| $P_0$ | Boost | Boost Motor 14 Pressure during Boost Operation | $P_0$ = Optimum (No Restriction) | Boost operation can use any propellant or motor configuration which is most optimum. |
| $P_1$ | ACS | Gas Generator 50 Pressure | $P_1$ = Optimum (No Restriction) | Gas generator pressure when post boost motor is not operating |
| $P_1'$ | Post Boost | Gas Generator 50 Pressure | $P_1' \geq 2 P_2$ (can be variable) as long as this relationship holds | Gas generator pressure needed to assure choked flow in gas generator flow control valve to post boost motor |
| $P_2$ | Post Boost | Post Boost Motor 16 Pressure | $P_2 \geq 2 P_3$ | Post boost motor pressure needed to assure choked flow in post boost pressure control nozzle |
| $A_1$ | Variable | Gas Generator 50 Flow Control Area | Variable | Gas generator flow control area can be variable to provide different areas and/or flow direction for attitude control system, post boost motor operation, larger area for gas generator extinguishment, and closed for extinguishing post boost motor. |
| $A_2$ | Post Boost | Post Boost 16 Pressure Control Nozzle Area | $A_2 < A_3$ | To assure that operating pressure and pressure decay transients in the post boost motor are controlled by $A_2$ rather than $A_3$ and also to assure that both Kn and L* in the post boost motor are controlled by $A_2$ to provide extinguishment. |

The flow control valve 58 includes a relatively large area outlet port 66 for gas generator grain extinguishment as well as a closed position for cutting off gaseous flow through manifold system 60 to diffuser 46 thereby to cause extinguishment of the post boost motor grain 42. In order to ensure that operating pressure and pressure decay transients in the post boost motor 16 are controlled by area $A_2$ rather than area $A_3$ and also to ensure that both Kn and L* in the post boost motor are also controlled by area $A_2$ to provide extinguishment, area $A_3$ must be larger than area $A_2$.

Propellant choices for both the boost motor 14 and the gas generator 50 are fairly unlimited while the propellant 42 for the post boost motor 16 must be capable of providing high specific impulse when mixed with the gas from gas generator 50 and must be capable of extinguishing upon termination of the flow of gas from the gas generator 50. Fluorocarbon propellants are unique in this regard.

Typically, the boost motor 14 utilizes a propellant grain of high energy cross-linked double-based propellant or any high energy composite propellant. In a preferred embodiment, the extinguishable characteristics of the post boost motor propellant grain 42 is a grain made of non-metallized fluorocarbon type propellant. The gas generator propellant grain 52 may be a 3000° F. HTPB/HMX gas generator propellant or any 2000°–3000° F. gas generator propellant.

By way of illustration and not limitation, it is noted that the constituents of the several propellant grains 34, 42 and 52 may consist of the following:

Propellant Grain 34

Any propellant grain

Propellant Grain 42

16% $C_7$ Fluoroacrylate Binder
84% Ammonium Perchlorate

Propellant Grain 52

15% Hydroxyl Terminated Polybutadiene Binder
85% Nitramine (HMX or RDX)

The present invention provides a multiple propellant solid rocket motor capable of utilizing a relatively unlimited choice of propellant grains as long as the post boost motor propellant grain is capable of providing high specific impulse when mixed with the generated gas and is capable of extinguishing upon termination of the generated gas flow.

Thus, in accordance with the present invention, there has been provided a unique integrated stage arrangement for accomplishing boost and repeated throttling post boost operations, on demand, and having as an added feature an attitude control system. The arrangement of the invention has the following advantages over prior art approaches for accomplishing both boost and post boost operations with separate propulsion systems:
1. A single propulsion system to accomplish both functions is more reliable and less costly.
2. A minimum volume, minimum weight system for accomplishing both boost and post boost operations.
3. Utilization of the highest performing solid propellant combinations available for both the boost and post boost motor operations.
4. Increased operating flexibility with on-demand throttling and/or total extinguishment capability with the gas generator.
5. Capability for extreme thrust ratios (turn down ratio); that is, F boost/F post boost>20 F boost/F ACS>100
6. Typical propellants used provide maximum specific impulse during boost as well as maximum specific impulse post boost that can be achieved with an extinguishable post boost propellant which also has a low contamination and low infra-red (IR) signature plume.

As those skilled in the art will understand, other options can be incorporated, if desired, into the unique propulsion arrangement of the present invention to improve adaptability and performance flexibility. Thus, for example:

1. The second casing 48 including gas generator 50 can be packaged along side of the first casing 12 for the boost/post boost motors, if necessary.
2. The bulkhead 26 could be separated with a linear shaped charge and used as an expansion nozzle for the post boost motor 16, if desired; thrust vector control could be provided through the ACS thrusters.
3. The post boost motor 16 can be used for added boost or maneuvering.
4. More than one gas generator 50 could be added to extend burning times or to facilitate packaging. Such additional gas generators 50 may be packaged along side casing 12 and the entire assembly arranged to fit within a cylindrical housing for use as a rocket or a stage of a rocket.

Also, as those skilled in the art will understand, the integrated staged combustion arrangement has application to many propulsion systems. Specifically, this arrangement has application to strategic systems requiring both boost and post boost propulsion, advanced antiballistic missile interceptors requiring boost/sustain thrust and on/off operation, space motors for deploying satellites by accomplishing both perigee and apogee burns with a single motor or as an on-demand orbit transfer vehicle for changing orbits, and for tactical motors requiring boost/sustain and/or pulse motor operation.

While exact construction details for the rocket of the present invention are not specifically set forth, it should be realized that standard rocket construction techniques and methods may be used for manufacturing the rocket as long as the dimensional requirements and ratios disclosed herein are met.

Having described the invention in detail, those skilled in the art will appreciate that modifications may be made to the invention without departing from its spirit. Therefore, it is not intended that the scope of the invention be limited to the specific embodiments illustrated and described. Rather, it is intended that the scope if this invention be determined by the appended claims and their equivalents.

What is claimed:
1. A multiple propellant solid rocket motor comprising:
 a first enclosure having a fist chamber containing a solid propellant and means for exhausting propellant combustion gases from the first enclosure to provide rocket motor thrust;
 first ignition means for igniting the solid propellant;
 a second enclosure associated with but insulated from the first enclosure having a second chamber containing an extinguishable solid propellant;
 a third enclosure having a third chamber containing a gas generating propellant capable of generating a gas that is capable of igniting the extinguishable propellant;
 second ignition means for igniting the gas generating propellant;
 means for releasing generated gas within the second enclosure so as to contact, ignite, and combustibly react with the extinguishable solid propellant therein;
 pressure control means intermediate the first and second enclosures for maintaining choked extinguishable propellant combustion gas flow from the second enclosure to the first enclosure during extinguishable solid propellant combustion;
 removable, insulative, plug means associated with the pressure control means to seal the pressure control means until extinguishable solid propellant combustion;

means for removing the plug means in association with extinguishable solid propellant combustion;

transfer means intermediate the second and third enclosures for channeling gas generated in the third enclosure to the releasing means within the second enclosure;

gas pressure control means associated with the transfer means and intermediate the second and third enclosures for maintaining choked flow of gas from the third enclosure to the second enclosure during gas generation; and an insulating bulkhead intermediate said first and second enclosures, said pressure control means comprises an opening in the insulated bulkhead between the first and second enclosures, the opening having an operative area maintaining choked extinguishable propellant combustion gas flow from the second enclosure to the first enclosure during extinguishable solid propellant combustion, and the plug means comprises an insulated diaphragm plugging the insulating bulkhead opening.

2. The multiple propellant solid rocket motor as set forth in claim 1 including means for terminating the generation of gas by said gas generating propellant and in which said second ignition means has multiple ignition capability.

3. The multiple propellant solid rocket motor as set forth in claim 1 in which the releasing means within said second enclosure comprises a diffuser.

4. A multiple propellant solid rocket motor comprising:

a first casing including a solid boost motor and an adjacent mass augmented controllable solid post boost motor;

an internal, insulating bulkhead intermediate the boost motor and the post boost motor, the bulkhead having an opening therein defining a post boost pressure controlled nozzle allowing communication between the boost motor and the post boost motor during post boost motor operation, the post boost pressure control nozzle having a first area such that propellant gas flow through the pressure control nozzle remains choked during post boost motor operations;

an insulated burst diaphram plugging the bulkhead opening thereby preventing premature ignition of the post boost motor;

explosive means for rupturing the diaphram in association with operation of the post boost motor;

a high energy boost motor propellant grain within the boost motor for providing an initial high thrust or high impulse boost pulse;

a boost igniter within the boost motor for igniting the boost motor propellant grain;

an omniaxis movable nozzle associated with the first cylindrical casing, the nozzle having a second area larger than the first area for providing thrust vector control by means of propellant combustion gas exhaust;

a nozzle actuator operably associated with the movable nozzle for controllably moving the omniaxis nozzle;

a diffuser;

the post boost motor including an extinguishable propellant grain for providing stop and start post boost motor operation, said diffuser being associated with said post boost motor for distributing a gas onto the extinguishable propellant grain;

a gas generator multiple igniter;

a second cylindrical casing including a gas generator for post boost motor ignition and attitude control including a gas generator propellant grain, said gas generator multiple igniter being associated with said gas generator for repeated ignition of the gas generator propellant grain and production of the generated gas;

a multiport flow control valve for control of generated gas flow, the valve having an inlet port, a first outlet port, a second outlet port, and a plurality of attitude control outlet ports;

an attitude control system including a plurality of gas discharge ports;

a manifold operatively connecting the gas discharge ports and flow control valve attitude control outlet ports for rocket attitude control, the gas generator and the inlet port for gas flow from the gas generator to the flow control valve, the first outlet port and the diffuser for gas flow from the gas generator through the flow control valve to the post boost motor and diffuser for post boost motor ignition and throttling, the second outlet port and exterior of the flow control valve for venting gas from the gas generator and extinguishment of the gas generator grain due to rapid depressurization of the gas generator;

the flow control valve providing variable flow direction and a variable operative area from full open to closed such that gas flow through the flow control valve during post boost motor operation remains choked and post boost motor combustion extinguishment when closed.

5. The multiple propellant solid rocket motor as set forth in claim 1 further comprising control means for rocket attitude control activated by controlled gas generating propellant combustion.

6. The multiple propellant solid rocket motor as set forth in claim 1 in which the means for removing the plug means comprises explosive means.

7. The multiple propellant solid rocket motor as set forth in claim 6 in which the explosive means comprises a detonator.

8. The multiple propellant solid rocket motor as set forth in claim 6 in which the explosive means comprises a linear shaped charge.

9. The multiple propellant solid rocket motor as set forth in claim 1 in which the pressure control means comprises an opening blown out of the insulated bulkhead with a linear shaped charge.

10. The multiple propellant solid rocket motor as set forth in claim 1 further comprising means for extinguishing combustion of the extinguishable solid propellant.

11. The multiple propellant solid rocket motor as set forth in claim 10 further comprising means for re-igniting the extinguishable solid propellant.

12. The multiple propellant solid rocket motor as set forth in claim 11 further comprising means for throttling the combustion of the extinguishable solid propellant.

13. A multiple propellant solid rocket motor comprising:

a first casing including a solid boost motor and an adjacent mass augmented controllable solid post boost motor;

an internal, insulating bulkhead intermediate the boost motor and the post boost motor, the bulkhead having an opening therein defining a post boost pressure controlled nozzle allowing communication between the boost motor and the post boost motor during post boost motor operation, the post boost pressure control nozzle having a first area such that propellant combustion gas flow through the pressure control nozzle remains choked during post boost operation;

an insulated burst diaphram plugging the bulkhead opening thereby preventing premature ignition of the post boost motor;

explosive means for rupturing the diaphram in association with operation of the post boost motor;

a high energy propellant grain within the boost motor for providing an initial high thrust or high impulse boost pulse;

a boost igniter for igniting the boost motor propellant grain;

an omniaxis movable nozzle having a second area larger than the first area, said omniaxis nozzle being associated with said first casing for providing thrust vector control;

a nozzle actuator operably associated with the movable nozzle for controllably moving the omniaxis nozzle;

said post boost motor including an extinguishable propellant grain for providing stop and start post boost motor operations and a diffuser for distributing a gas onto the extinguishable propellant grain for igniting the extinguishable grain;

a second gas casing including a gas generator for post boost motor ignition including a gas generator propellant grain and a gas generator multiple igniter for repeated ignition of the gas generator grain for production of a gas;

a multiport flow control valve for control of gas flow from said gas generator, the valve having an inlet port and having at least a first outlet port and a second outlet port;

a manifold operatively connecting the gas generator and the inlet port for gas flow from the gas generator to the flow control valve, the first outlet port and the diffuser for gas flow from the gas generator through the flow control valve to the diffuser and post boost motor for post boost motor ignition or throttling, the second outlet port and exterior of the flow control valve for venting gas and extinguishment of the gas generator propellant grain due to rapid depressurization of the gas generator;

the flow control valve providing variable flow direction and variable operative area from full open to closed such that gas flow through the flow control valve during post boost operations remains choked for ignition and throttling of the post boost motor and closed for extinguishment of the post boost motor.

14. The multiple propellant solid rocket motor as set forth in claim 13 in which the explosive means is a linear shaped charge.

15. The multiple propellant solid rocket motor as set forth in claim 13 in which the explosive means is a detonator.

16. The multiple propellant solid rocket motor as set forth in claim 13 in which the boost motor propellant grain comprises an high energy, cross-linked, double-based propellant.

17. The multiple solid rocket motor as set forth in claim 13 in which the boost motor propellant grain comprises a high energy composite propellant.

18. The multiple propellant solid rocket motor as set forth in claim 13 in which the post boost motor propellant grain comprises a non-metallized fluorocarbon type propellant.

19. The multiple propellant solid rocket motor as set forth in claim 13 in which the gas generator grain comprises a propellant having a combustion temperature in the range of 2000° F. to 3000° F.

20. The multiple propellant solid rocket motor as set forth in claim 19 in which the gas generator grain comprises a 3000° F. HTPB/HMX gas generator propellant.

21. The multiple propellant solid rocket motor as set forth in claim 19 in which the gas generator grain comprises any 2000° -3000° F. gas generator propellant.

22. The multiple propellant solid rocket motor as set forth in claim 13 wherein the insulated burst diaphram is integral with the insulated bulkhead such that a linear shaped charged detonation opens the bulkhead and forms the post boost pressure control nozzle.

* * * * *